May 14, 1968

R. E. PABST 3,382,840

THERMAL INDICATOR

Filed Aug. 18, 1965

INVENTOR
RICHARD E. PABST

BY  *Mauro & Lewis*

ATTORNEYS

May 14, 1968  R. E. PABST  3,382,840

THERMAL INDICATOR

Filed Aug. 18, 1965  3 Sheets-Sheet 3

INVENTOR
RICHARD E. PABST

BY *Mauro & Lewis*

ATTORNEYS

United States Patent Office 3,382,840
Patented May 14, 1968

3,382,840
THERMAL INDICATOR
Richard E. Pabst, Houston, Tex., assignor to Pabst Products, Inc., Houston, Tex., a corporation of Texas
Filed Aug. 18, 1965, Ser. No. 480,682
6 Claims. (Cl. 116—114.5)

ABSTRACT OF THE DISCLOSURE

Disclosed is a thermal fusible control signal or indicator device for indicating the presence of a selected degree of heat (e.g. for use in cooking). The device includes an automatic resetting mechanism adapting it for quick repeated uses.

---

This invention relates to a thermal indicator, a device which is responsive to a selected degree of heat, making a signal or other indication thereof which is visually or otherwise detectable.

More specifically, the device of my invention may be specially adapted as a cooking aid, a device which will indicate the cooked condition of viands or the like. By way of example in the description to follow I give illustrations of a device adapted to indicate the cooked condition of food items such as beef roasts, beefsteaks, poultry, or ham. The device, however, will obviously have other applications as a means to indicate a predetermined heat condition in substances other than foodstuffs.

The invention employs certain selected solids known to melt or fuse at various temperatures, the melting of which releases mechanisms in the device which in turn release a signal. In the examples, I prefer to employ mixtures of eutectic alloys which have melting points critical to the use of the invention as a cooking aid. These alloys can be concocted to melt at various exact degrees of temperature, and hence can be employed in the invention to trigger an indication of a desired terminal cooking or heat condition.

The device is shown in the form of a head member carrying an indicator flag. Depending beneath the head member is a heat sensing member or sensor in the form of a probe filled with a suitable alloy whose melting point has been adjusted to be the equivalent of the terminal point of the particular cooking operation in view. The probe is proportioned for insertion into the heart of the viand or the like to be cooked. A sensor shaft in the probe, connected to the indicator flag by a cam mechanism in the head, actuates the flag when the alloy is melted.

Important advantages of the device are that it can be re-used indefinitely without servicing it in any way, as by restoring the fusible material, and it can be re-used almost immediately. In the invention, part of the mechanism automatically re-cocks itself immediately after the indicator flag is tripped. The remainder of the mechanism including the indicator flag, can be re-cocked by a simple manual operation as soon as the alloy in the sensor has cooled and resolidified, which is easily accomplished by the application of cold to the sensor if immediate reuse is desired.

The device being very simple and cheap to construct, a kit or set of the same may be provided wherein each device contains a different alloy with a different melting point suitable for a particular cooking purpose.

The following are given as soome random examples of alloys suitable for use in my invention for cooking various food items:

For beef, medium: nominal temperature 160° F.—an alloy of 27% lead, 10% cadmium, 50% bismuth and 13% tin—having a melting point of 158° F.

For beef, rare: nominal temperature 140° F.—an alloy of 33% bismuth, 16% tin, and 51% indium—having a melting point of 142° F.

For poultry, done: nominal temperature 195° F.—an alloy of 52% bismuth, 40% lead and 8% cadmium—having a melting point of 198° F.

For ham (cured pork), done: nominal temperature 160° F.—an alloy of 34% bismuth, 66% indium—having a melting point of 162° F.

In the invention as illustrated, the indicator consists of a flag which, when tripped or triggered, moves to reveal a legend and also makes an audible click. This indicator could obviously be modified within the scope of the invention as claimed, so as to actuate a loud signal such as a bell, or to close an electric circuit leading to a local or a remote visual or audible signal.

Other features of the invention will be made apparent from a description of the drawings, wherein.

Figure 2:
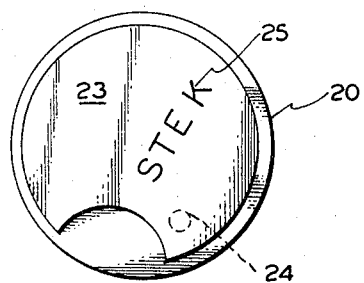
FIG. 2 is a top view of the indicator head, with indicator flag closed.
Figure 1:
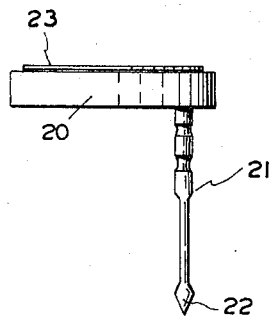
FIG. 1 is a side elevation of the invention.
Figure 3:
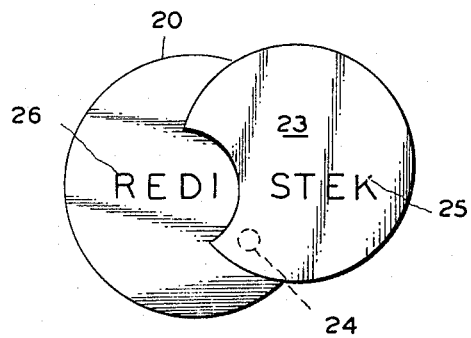
FIG. 3 is a similar top view, with indicator flag actuated.

As shown in FIGS. 1–3, the invention may take the form of a hollow disc-like body member 20, from which depends a sensor member 21 in the form of a hollow shaft capped by a barb 22 for insertion into the article to be cooked. On top of body 20 an indicator flag is mounted for partial pivotal movement on the axis of a shaft 24 connected within the body 20 to a cam mechanism to be described below.

If desired, a legend such as at 25 on flag 23 may be applied to indicate the purpose of the device, and another legend as at 26 may be placed on the top of the body 20 to indicate actuation of the device, the legend 26 being revealed only when flag 23 has moved to the FIG. 3 or actuated position.

The sensor member 21 will next be described with respect to FIGS. 7–11.

Figure 10:
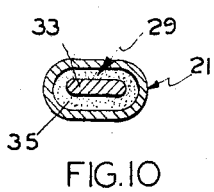
FIG. 10 is a cross section taken on lines 10—10 of FIG. 9.
Figure 11:
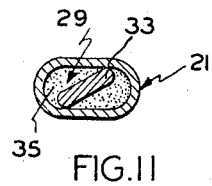
FIG. 11 is a section similar to that of FIG. 10, but showing the parts immediately after actuation of the indicator means.

Sensor 21 is a hollow tubular member having a barb 22 at is extremity, and is attached at its upper end over a cavity in the base of body member 20. Through this cavity extends a sensor shaft 30 whose upper portion is circular in cross section and passes within a tubular seal 32 into an oval shaped cavity 29, formed by partially flattening this portion of sensor 21. That part of sensor shaft 30 within cavity 29 is also flattened at 33 as will be noted from FIGS. 8–10, so that rotation of shaft 30 is limited as shown in FIG. 11. The cavity of sensor 21 is filled with a fusible alloy 35 selected for its particular melting point.

Figure 4:
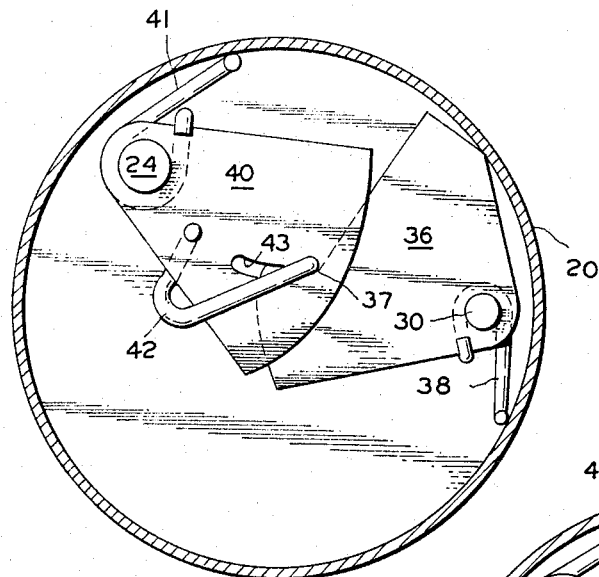
FIG. 4 is an enlarged top view, with head cover and indicator flag omitted, showing the cam mechanism in cocked or non-actuated condition.
Figure 5:
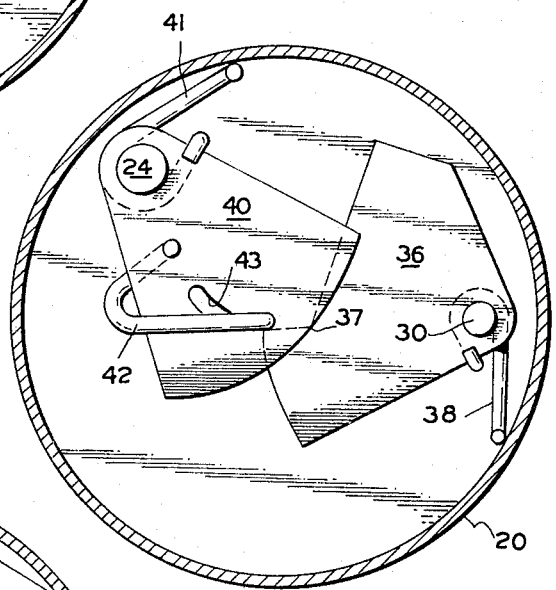
FIG. 5 is a view similar to FIG. 4, showing the cam mechanism just prior to actuation of the indicator flag.
Figure 6:
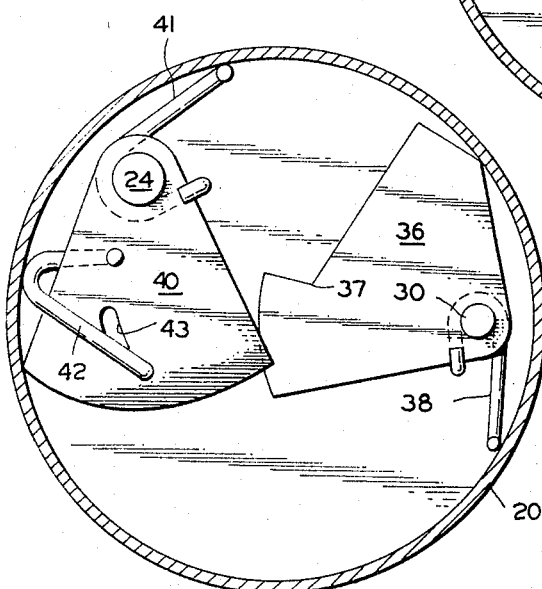
FIG. 6 is also a view similar to FIG. 4, showing the cam mechanism after actuation of the indicator flag.
Figure 7:
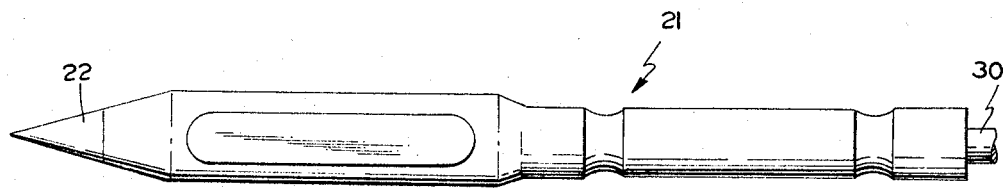
FIG. 7 is an enlarged detail in elevation, showing the sensor member.
Figure 8:
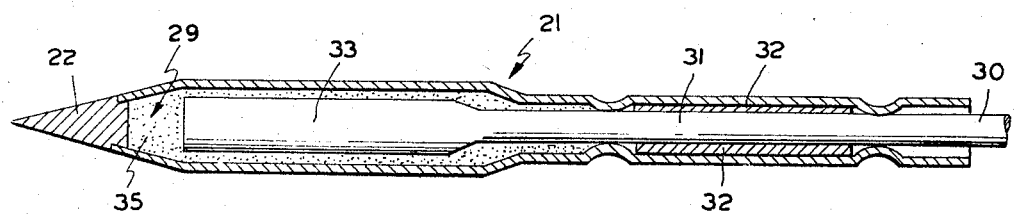
FIG. 8 is an enlarged detail in section, of the sensor member.
Figure 9:
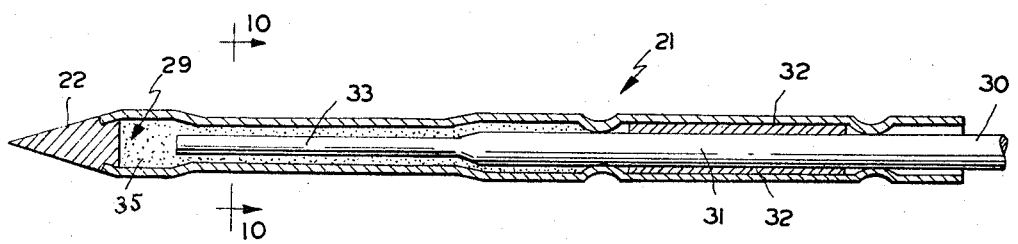
FIG. 9 is another enlarged detail in section of the sensor member, the section being taken at an angle of 90° to that of FIG. 8.

Referring also now to FIGS. 4–6, the top of shaft 30 protrudes into the hollow body 20 and is affixed to a flat cam member 36 having a notch 37. Cam 36 is spring-urged clockwise by spring 38 into the position shown in FIG. 4.

Shaft 24 is also journalled for rotation within body 20 and as above noted passes externally of body 20 and carries the indicator flag 23. Shaft 24 carries a second cam member 40 which partially overlaps cam 36 and is spring-urged in a clockwise direction by spring 41, which supplies a more powerful thrust than spring 38 for reasons noted below. Latching contact between cams 36 and 40 is achieved by means of a spring latch member 42 which is affixed to the bottom of cam 40 and passes over it and into a slot 43, extending therethrough so that its free depending end can engage notch 37 of cam 36, as shown in FIG. 4.

Mode of operation

Prior to use of the device, it is cocked with the indicator flag 23 in the FIG. 1 position and with the cam mechanism in the FIG. 4 position. The shaft 30 is in the FIGS. 8–10 position with the flat tip 33 thereof suspended out of contact with the walls of oval cavity 29 of sensor 21. In this condition, it will be appreciated, neither cam can move since shaft 30 is held against any rotation due to its immersion in the alloy 35 in a solid state.

When put to use, sensor 21 is inserted into the article to be cooked. As the cooking heat in the vicinity of cavity 29 reaches the melting point of the fusible material or alloy 35, the latter liquifies, thus freeing shaft 30 for limited rotational movement. When this occurs, cam 40, urged by spring 41, can rotate clockwise, overcoming the resistance of cam 36, since, as said above, spring 41 is more powerful than spring 38, a movement takes place as shown in FIG. 5 where cam 40 is moving clockwise carrying cam 36 with it to a point where the tip of spring 42 is disengaged from the notch 37 of cam 36, and becomes disconnected as shown in FIG. 6. Since flag 23 is also mounted on shaft 24, the release of cam 40 causes flag 23 to make the indication shown in FIG. 3.

As cam 36 is thus forced counterclockwise, the shaft 30 rotates with it and the flat tip 33 will momentarily assume the positon shown in FIG. 11. Immediately, however, spring 38 will assert its force and return cam 36 to the FIG. 6 (and also FIG. 4) position, with shaft 30 in its initial position with tip 33 again as shown in FIG. 10.

The device thus becoms patrially re-cocked immediately after use, most importantly, before the fusible material 35 can resolidify, since if shaft 30 remained in the FIG. 11 position after fusible material 35 had solidified, the device would not be re-usable without considerable difficulty.

The complete re-cocking of the device, it becomes apparent that the first step is to remove the device and restore the fusible material 35 to a solid state by cooling it or allowing it to cool back to below its melting point.

With material 35 again in a solid state, shaft 30 and cam 36 are again rendered immobile, so by manually moving the indicator flag 23 from its FIG. 3 position to the FIG. 2 position, cam 40 is returned to a latch connection with cam 36, spring 42 being movable within slot 43 so as to slip over cam 36 and into its notch 37, so that the parts are returned to the FIGS. 2 and 4 position.

What is claimed is:
1. A thermal indicator comprising an indicator head, a sensor member connected to said head adapted for insertion into the medium provided for heat measurement, said sensor member having a sealed cavity containing a solid having a predetermined fusion point when exposed to heat, a sensor shaft having one end embedded in said solid in cavity, the other end of said sensor shaft extending within said indicator head, a heat indicating signal member carried by said head, and spring-urged means within said head connected between said signal member and said sensor shaft actuating said signal member upon release of said sensor shaft at fusion point of said solid, and spring-urged means adapted to return said sensor shaft to its initial position after actuation of said signal member.

2. The thermal indicator according to claim 1, wherein the end of the sensor shaft in said sealed cavity is flattened.

3. The thermal indicator according to claim 2, wherein the sealed cavity of said sensor member is flattened.

4. A thermal indicator comprising an indicator head, a sensor member connected to said head adapted for insertion into a medium provided for heat measurement, said sensor member having a sealed cavity containing a solid having a predetermined fusion point when exposed to heat, a sensor shaft having one end embedded in said solid in said cavity, the other end of said shaft extending within said indicator head, a heat indicating signal member carried on a shaft mounted within said head, a first spring-urged cam connected to said shaft of said signal member tending to actuate said signal member, such actuation being normally prevented by a second cam latched to said first cam and mounted on said sensor shaft, fusion of said solid in the presence of a predetermined heat lever permitting rotation of said sensor shaft and release of said first cam from said second cam and actuation of said signal member, and spring means connected to said second cam returning said sensor shaft to its initial position after release of said first cam.

5. The invention according to claim 4, wherein the latch connection between said first and second cams consists of a spring on said first cam yieldingly engaged in a notch formed on said second cam.

6. The invention according to claim 4, wherein the sealed cavity of said sensor member and the end of the sensor shaft in said cavity are flattened to permit only partial rotation of the sensor shaft upon fusion of the solid.

References Cited
UNITED STATES PATENTS

| | | | |
|---|---|---|---|
| 945,978 | 1/1910 | Nielsen et al. | 73—352 |
| 1,476,864 | 4/1923 | West | 116—106 |
| 1,802,231 | 8/1929 | Blondin | 73—358 |

LOUIS R. PRINCE, *Primary Examiner.*

J. W. ROSKOS, *Assistant Examiner.*